US012077228B2

(12) United States Patent
Zaharia et al.

(10) Patent No.: US 12,077,228 B2
(45) Date of Patent: Sep. 3, 2024

(54) TRACK SLIDER DESIGN FOR AN ELECTRIC ROPE SHOVEL

(71) Applicant: Caterpillar Global Mining LLC, Tucson, AZ (US)

(72) Inventors: Cristian Zaharia, Marana, AZ (US); Elizabeth J. Barnes, Tucson, AZ (US); Michael W. Haws, Wind Point, WI (US); Mircea Dumitru, Washington, IL (US); Aruna Kinjarapu, Oro Valley, AZ (US)

(73) Assignee: Caterpillar Global Mining LLC, Tucson, AZ (US)

( * ) Notice: Subject to any disclaimer, the term of this patent is extended or adjusted under 35 U.S.C. 154(b) by 622 days.

(21) Appl. No.: 17/243,812

(22) Filed: Apr. 29, 2021

(65) Prior Publication Data

US 2022/0348273 A1 Nov. 3, 2022

(51) Int. Cl.
*B62D 55/084* (2006.01)
*B62D 55/10* (2006.01)
*B62D 55/32* (2006.01)

(52) U.S. Cl.
CPC ......... *B62D 55/0847* (2013.01); *B62D 55/10* (2013.01); *B62D 55/32* (2013.01)

(58) Field of Classification Search
CPC .... B62D 55/10; B62D 55/07; B62D 55/0847; B62D 55/084; B62D 55/32
USPC .......................... 305/139, 127, 121, 122, 120
See application file for complete search history.

(56) References Cited

U.S. PATENT DOCUMENTS

| | | | |
|---|---|---|---|
| 1,660,105 A * | 2/1928 | Smyth | B62D 55/04 305/120 |
| 1,946,660 A | 2/1934 | Baker | |
| 5,941,326 A | 8/1999 | Fleuchaus | |
| 9,988,110 B2 | 6/2018 | Scheuerman et al. | |
| 10,543,876 B2 * | 1/2020 | Dumitru | B62D 55/0845 |
| D941,886 S * | 1/2022 | Dumitru | D15/28 |
| 2014/0265548 A1 * | 9/2014 | Vitas | B62D 55/0847 305/124 |
| 2015/0130268 A1 * | 5/2015 | Scheuerman | B62D 55/26 305/116 |

(Continued)

FOREIGN PATENT DOCUMENTS

| | | | |
|---|---|---|---|
| CN | 104986235 A | 10/2015 | |
| CN | 306141916 S | 10/2020 | |
| JP | 2004299664 | * 10/2004 | ............. B62D 55/08 |

(Continued)

OTHER PUBLICATIONS

Written Opinion and International Search Report for Int'l. Patent Appln. No. PCT/US2022/022241, mailed Jul. 15, 2022 (9 pgs).

*Primary Examiner* — S. Joseph Morano
*Assistant Examiner* — Eva L Comino

(57) ABSTRACT

A transition track slider has a hollow body including a first side surface, a second side surface, a bottom surface at least partially interposed between the first side surface and the second side surface, and that also defines a cavity. A front surface with a bullet nose configuration connects the first side surface to the second side surface, and to the bottom surface, while a rear surface connects the first side surface to the second side surface, and to the bottom surface. A top surface extends from the rear surface toward the front surface.

20 Claims, 11 Drawing Sheets

(56) References Cited

U.S. PATENT DOCUMENTS

2018/0170463 A1\* 6/2018 Dumitru ................ B62D 55/10
2022/0242502 A1\* 8/2022 Baldwin ................ B62D 55/10

FOREIGN PATENT DOCUMENTS

| JP | 6529368 B2 \* | 6/2019 | ............. B62D 55/30 |
| KR | 20180071175 A | 6/2018 | |
| WO | 2018048537 A1 | 3/2018 | |
| WO | 2018112195 A1 | 6/2018 | |

\* cited by examiner

TRACK SLIDER DESIGN FOR AN ELECTRIC ROPE SHOVEL

TECHNICAL FIELD

The present disclosure relates to track sliders used to support and guide the track chains for heavy equipment using endless track drives. Specifically, the present disclosure relates to track sliders that lead to less maintenance over time.

BACKGROUND

In many current applications, track sliders are used to support and guide track chains on heavy equipment such as electric rope shovels and the like. These track sliders may become worn or cracked due to the harsh environment in which they are used. Also, the mounting hardware and mounting plates may also experience wear, cracks, weld weakening, etc.

In particular, oilsands applications are known to require maintenance or replacement after 4,000 to 6,000 operating hours. In order to replace the sliders, the track chains need to be disassembled, allowing access to the track sliders and their mounting hardware. This requires undesirable extended downtime.

Various track slider geometries are known in the art including the track slider geometry disclosed in U.S. Pat. No. 9,988,110. The '110 patent discloses a crawler mechanism includes a frame, a track including a plurality of shoes coupled together and supported for movement relative to the frame along a direction of travel, a sprocket, and a guide rail (or set of track sliders). The frame includes a first end, a second end, a first side extending between the first end and the second end and proximate a support surface, and a second side. Each shoe includes an intermediate portion having a first hardness. The sprocket drives the plurality of shoes to move along the second side of the frame. The guide rail is coupled to the second side of the frame and includes a base having an outer surface and a coating bonded to the outer surface. The coating contacts the intermediate portion of the shoes as the shoes move along the second side of the frame, and the coating defines a second hardness less than the first hardness.

However, there is a need to develop a track slider design that is more robust and less prone to need maintenance than has heretofore been devised.

SUMMARY

A transition track slider according to an embodiment of the present disclosure may comprise a hollow body including a first side surface, a second side surface, as well as a bottom surface that is at least partially interposed between the first side surface and the second side surface, and defining a cavity. A front surface may connect the first side surface to the second side surface and to the bottom surface, while a rear surface may connect the first side surface to the second side surface and to the bottom surface. A top surface may extend from the rear surface toward the front surface defining a top surface radius of curvature ranging from 2200 mm to 2600 mm.

A transition track slider according to another embodiment of the present disclosure may comprise a hollow body including a first side surface, a second side surface, and a bottom surface that is at least partially interposed between the first side surface and the second side surface, defining a cavity. A front surface may connect the first side surface to the second side surface and to the bottom surface, while a rear surface may connect the first side surface to the second side surface and to the bottom surface. A top surface may extend from the rear surface toward the front surface. The front surface may define a bullet nose configuration.

A transition track slider according to yet another embodiment of the present disclosure may comprise a hollow body including a first side surface, a second side surface, as well as a bottom surface that is at least partially interposed between the first side surface and the second side surface, defining a cavity. A front surface may connect the first side surface to the second side surface and to the bottom surface, while a rear surface may connect the first side surface to the second side surface and to the bottom surface. A top surface may extend from the rear surface toward the front surface. The hollow body may define a first angled contact pad disposed in the cavity nearest the front surface, and a first top contact pad disposed in the cavity nearest the top surface and the first angled contact pad, forming an external angle with the first angled contact pad ranging from 120.0 degrees to 150.0 degrees.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
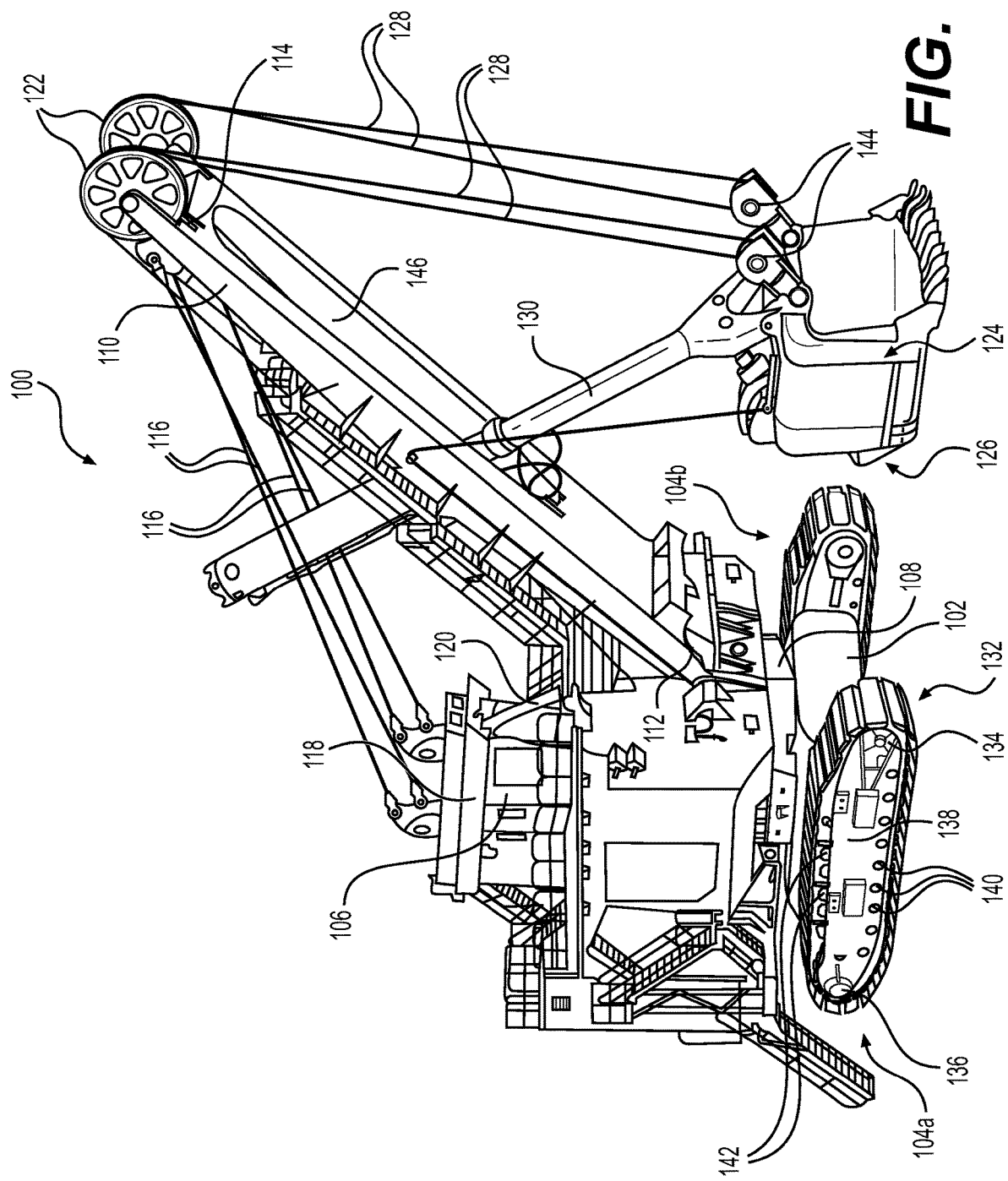
FIG. 1 is a perspective view of a machine such as an electric rope shovel having a carbody assembly and/or a roller frame assembly that may employ a track slider configured according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include a roller frame assembly, and an inline roller frame assembly that may use a plurality of track sliders and/or track slider mounting plates configured according to various embodiments of the present disclosure, etc. First, a machine that may use such embodiments will be discussed.

Referring to FIG. 1, there is shown a machine 100 having a carbody 102 (which may include a turntable 108) with a track system including a first track chain 104a and a second track chain 104b positioned at opposite sides of carbody 102. Machine 100 is shown in the context of an electric rope shovel having an operator cab 106, a boom 110, a lower end 112 of the boom 110 (also called a boom foot), an upper end 114 of the boom 110 (also called a boom point), tension cables 116, a gantry tension member 118, a gantry compression member 120, a sheave 122 rotatably mounted on the upper end 114 of the boom 110, a dipper bucket 124, a dipper door 126 pivotally coupled to the dipper bucket 124, a hoist rope 128, a winch drum (not shown), and a dipper handle 130. An electric motor controls the winch drum, causing the lowering or raising of the boom, dipper bucket, and upward and downward movement of the dipper handle relative to the boom.

Tracks 104a and 104b are part of a machine undercarriage 132 coupled with carbody 102 in a conventional manner. Each of tracks 104a and 104b include a plurality of coupled together track shoes forming endless loops extending about a plurality of rotatable elements. In a typical design, an idler 134 and a drive sprocket 136 will be associated with each of tracks 104a and 104b and mounted to a track roller frame 138. A plurality of track rollers 140 may also be mounted to roller frame 138, and are associated with each of tracks 104a and 104b to support machine 100 and guide tracks 104a and 104b in desired paths, as further described herein. One or more carrier rollers 142 (or track sliders as will be discussed momentarily herein) may also be associated with each of tracks 104a and 104b to support and guide the tracks opposite rollers 140 during operation.

The unique design of tracks 104a and 104b and the overall track and undercarriage system of which they are a part are contemplated to enable machine 100 to operate in certain environments such as hard underfoot conditions without the shortcomings associated with many earlier designs. While use in the machine environment of an excavator is emphasized herein, it should be understood that machine 100 might comprise a different type of machine. For instance, track-type tractors or even half-track machines are contemplated herein. Further still, machine 100 might consist of a conveyor or other type of machine wherein tracks are used for purposes other than as ground engaging elements. Also, the machine might be some type of hydraulic shovel, bulldozer, excavator, back hoe, etc.

The dipper bucket 124 is suspended from the boom 110 by the hoist rope 128. The hoist rope 128 is wrapped over the sheave 122 and attached to the dipper bucket 124 at a bail 144. The hoist rope 128 is anchored to the winch drum (not shown). The winch drum is driven by at least one electric motor (not shown) that incorporates a transmission unit (not shown). As the winch drum rotates, the hoist rope 128 is paid out to lower the dipper bucket 124 or pulled in to raise the dipper bucket 124. The dipper handle 130 is also coupled to the dipper bucket 124. The dipper handle 130 is slidably supported in the saddle block 146, and the saddle block 146 is pivotally mounted to the boom 110 at the shipper shaft (not clearly shown). The dipper handle 130 includes a rack and tooth formation thereon that engages a drive pinion (not shown) mounted in the saddle block 146. The drive pinion is driven by an electric motor and transmission unit (not shown) to extend or retract the dipper handle 130 relative to the saddle block 146.

An electrical power source (not shown) is mounted to the carbody 102 to provide power to a hoist electric motor (not shown) for driving the hoist drum, one or more crowd electric motors (not shown) for driving the crowd transmission unit, and one or more swing electric motors (not shown) for turning the turntable 108. In some cases, one electric motor powers all of the moving components of the shovel. Each of the crowd, hoist, and swing motors is driven by its own motor controller, or is alternatively driven in response to control signals from a controller (not clearly shown).

The track chains 104a and 104b are considered to be well suited for work in hard underfoot conditions. To this end, the track chains 104a and 104b may be "high ground pressure" tracks, each having track members durable enough to support a relatively large weight of machine 100. Each of track shoe members has a footprint defined in part by front and back edges, and also defined in part by outboard edges and inboard edges. Each of track shoe members may further include a ground contact area that is equal to its footprint, or less than its footprint only to an extent that adjacent track shoes overlap one another or due to voids disposed on the bottom surface of the track shoe member.

Figure 2:
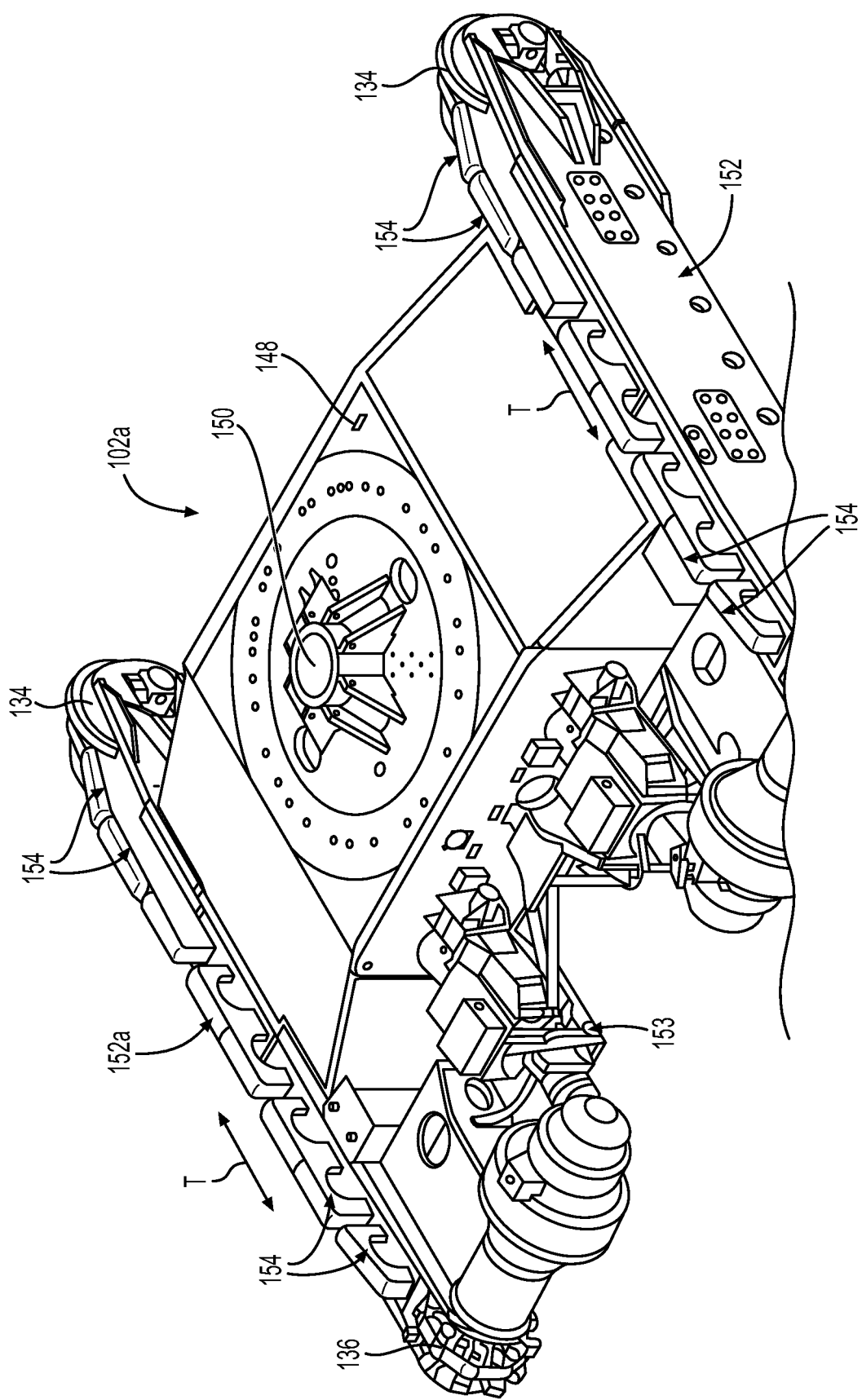
FIG. 2 depicts a carbody assembly similar to that of the machine of FIG. 1 shown in isolation from the rest of the machine, pointing out locations of various track sliders.

Turning now to FIG. 2, a carbody 102a that may be used with the machine 100 just described is shown in isolation from the rest of the machine. As can be seen, the platform 148 on which the turntable (not shown) rests as well as the drive structure 150 that mates with the turntable for rotating the turntable is also shown. A pair of similarly, or symmetrically, configured roller frame assemblies 152, 152a are also shown that include an idler wheel 134, a sprocket 136, and a plurality of track sliders 154 that may support the track chain assembly (not shown) as the transmission 153 drives the sprocket 136, and the track chain assembly. The track sliders are so called since they do not move or rotate like rollers, but instead function by allowing the track chain assembly to slide over them. The direction of travel T along which the track chain assembly (not shown) would move, is also shown.

Now, various track sliders and associated assemblies and features that are configured according to various embodiments of the present disclosure will be discussed in detail. For example, the slider's contact pads may be moved towards the center of the slider to distribute stress away from the end of mounting plate. Also, the sliders may be bolted onto the mounting plates to improve serviceability. In addition, the top wear material of the slider may be increased to augment the useful life of the slider. In some cases, a lower nose profile, which creates a shorter moment arm, may decrease the stresses exerted on these components of the undercarriage. Moreover, the track travel sweep may be improved for better clearance with nearby components, helping to prevent unwanted snags and the like.

More specifically, the ends (nose) of the track slider may be tapered towards an inward direction in order to distribute stress away from the ends of the mounting plate and to minimize the wear at the end portion (nose) of the slider. Consequently, the roller frame assembly structure may have a useful life improved above the life expectancy of current similar structures (possibly 150K>65K hours).

An inline roller frame assembly with track sliders configured according to various embodiments of the present disclosure will now be discussed. An inline roller frame assembly is so called since it lacks an elevated sprocket, so that the track chain assembly moves along a racetrack or an oval path. Other embodiments of the present disclosure may have an elevated roller frame assembly, so called since the sprocket is elevated above two idler wheels, producing a triangular path (not shown) for the track chain assembly. Other configurations are possible.

Figure 3:
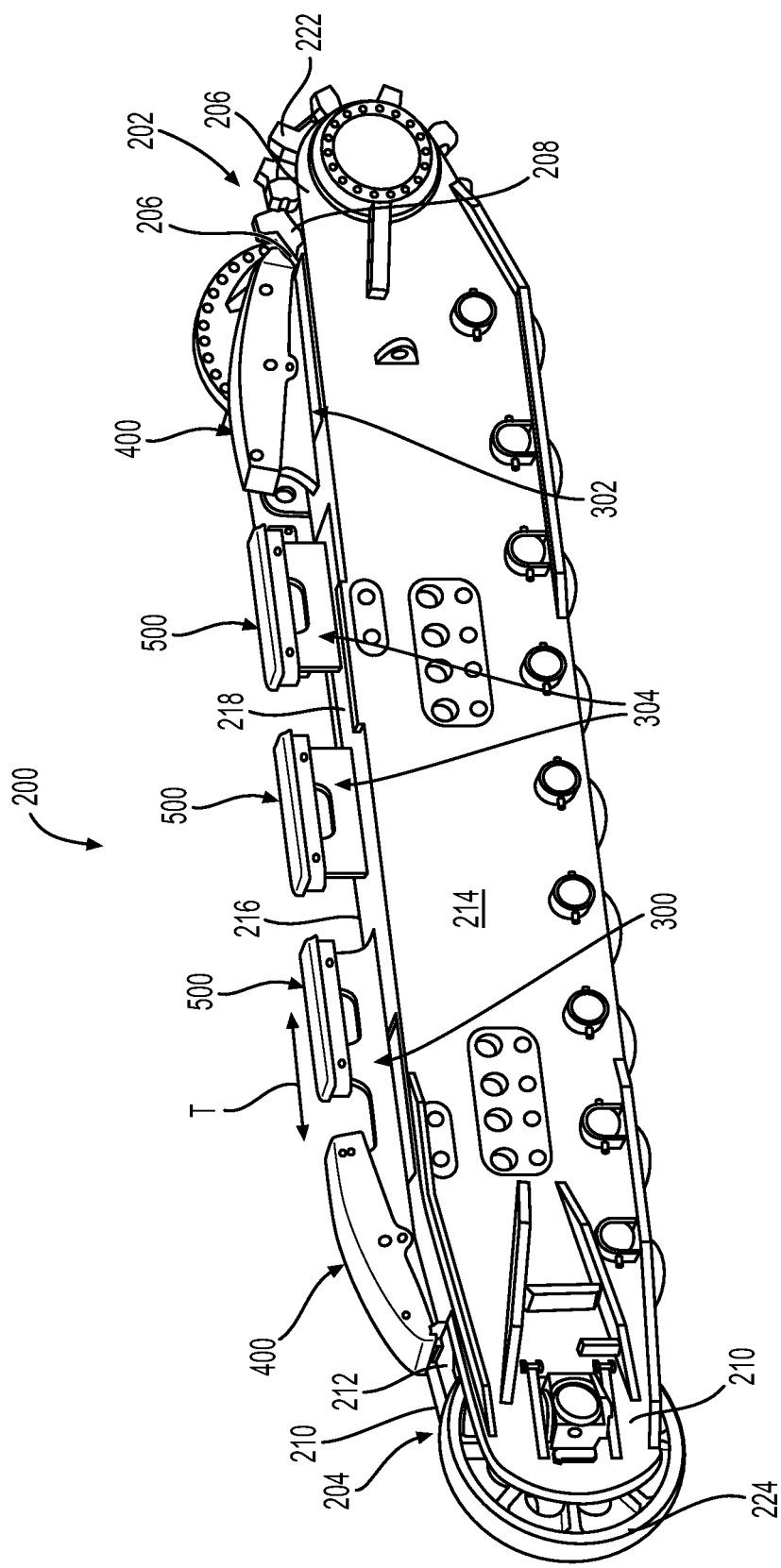
FIG. 3 is a perspective view of a roller frame assembly that may be used in the carbody assembly of FIG. 2, illustrating the use of various track sliders configured according to embodiments of the present disclosure.
Figure 4:
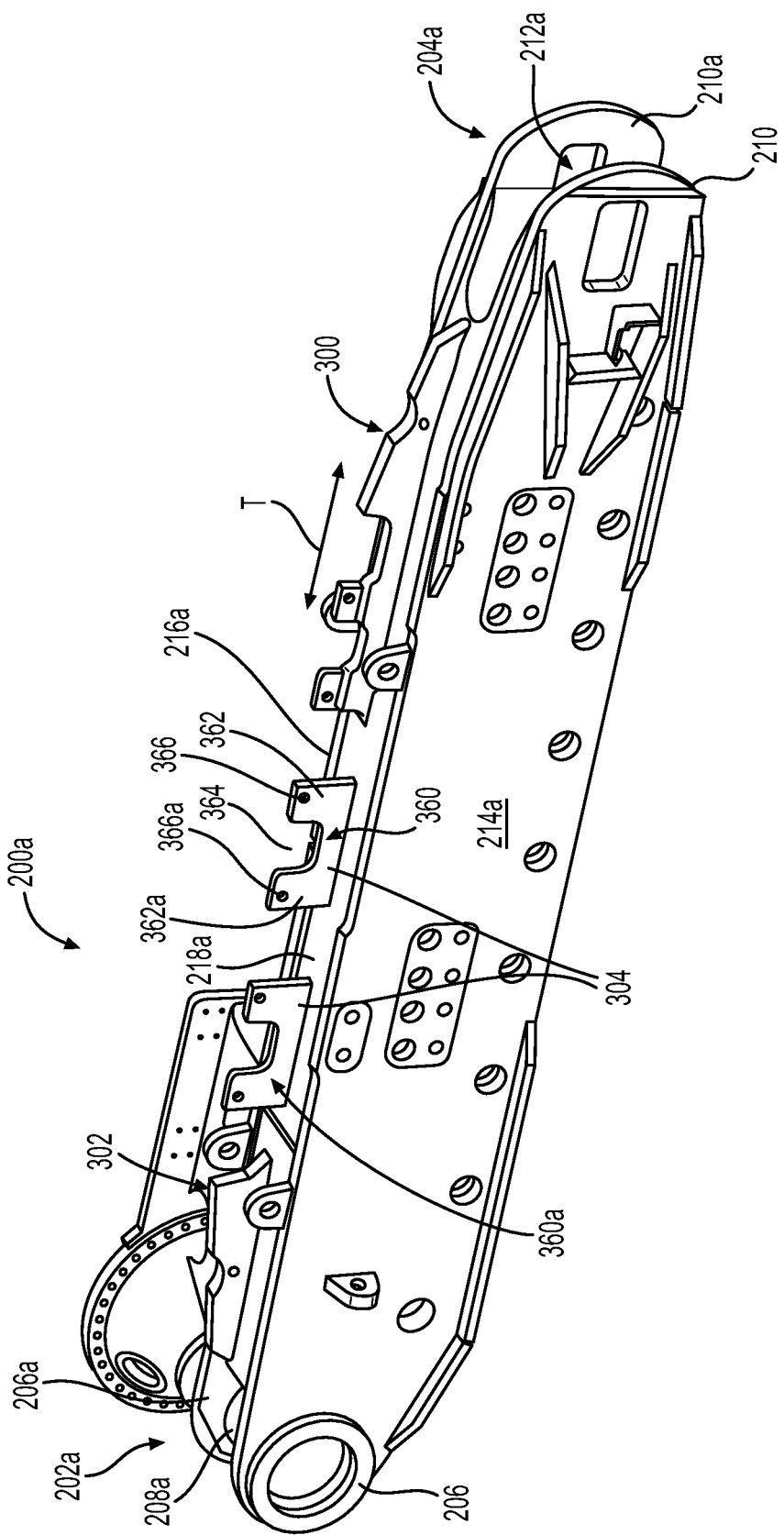
FIG. 4 is an alternate perspective view of a roller frame assembly similar to that of FIG. 3 (may be symmetrical) with the track sliders removed, revealing the mounting plates including various embodiments of a shark fin style mounting plate used to mount the track sliders.

Looking at FIGS. 3 and 4, the inline roller frame assembly 200, 200a may comprise a first sprocket attachment portion 202, 202a (e.g., a rear forked portion with two apertured ears 206, 206a for receiving a rotating shaft, the ears defining a sprocket receiving slot 208, 208a therebetween), a first idler attachment portion 204, 204a (e.g., a front forked portion with two slotted ears 210, 210a for receiving a shaft that may reciprocate therein, the ears also defining an idler slot 212, 212a), a first side frame member 214, 214a (e.g., a metal or steel plate fabricated via laser jet cutting, laser beam cutting, wire electric discharge machining, milling, etc.), a second side frame member 216, 216a (e.g., a metal or steel plate), and a top frame member 218, 218a (e.g., a metal or steel plate) connected to the first side frame member 214, 214a, and the second side frame member 216, 216a. These frame members may be bolted, riveted, or welded to each other, etc. These members as well as the track sliders are often elongated along the direction of travel T of the track chain (not shown) when in use.

Figure 5:
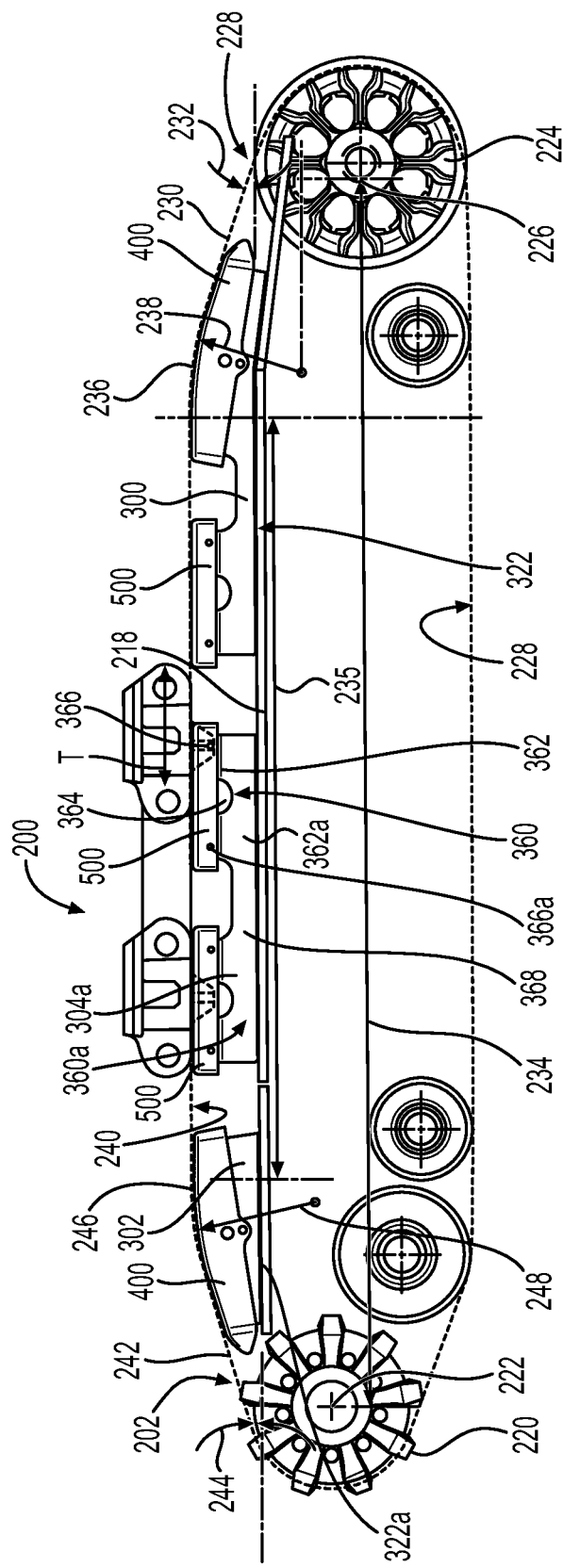
FIG. 5 is a side view of a roller frame assembly similar to that of FIG. 4, showing the track chain path formed by the track sliders.

Also, a plurality of slider mounting plates 300, 302, 304, 304a may also be attached to the top frame member 218, 218a via welding, fastening, etc. As best seen in FIGS. 3 and 5, a plurality of sliders 400, 500 may be attached to the plurality of slider mounting plates including a front slider 400 (may also be referred to as a transition slider since it helps the track chain assembly to transition from the front to the top of the track chain routing path), a rear slider 400 (may also be referred to as a transition slider since it helps the track chain assembly to transition to/from the rear to the top of the track chain routing path, the front and rear slider may be identically configured, but not necessarily), and at least one intermediate slider 500.

When fully assembled as seen in FIG. 5, a sprocket 220 may be attached to the first sprocket attachment portion 202 defining a sprocket axis of rotation 222 and an idler 224 may be attached to the first idler attachment portion 204 defining an idler axis of rotation 226. As mentioned earlier herein, a mechanism such as a hydraulic cylinder, a mechanical linkage(s), a rack and pinion, etc. may translate the idler 224 and its shaft back and forth in the idler receiving slot(s) 212, 212a (see FIGS. 3 and 4) to adjust the track chain tension. The tension, as well as the track chain tangency route 228 shown in FIG. 5, affects the stresses exerted on the various components of the assembly including the track sliders, the slider mounting plates, and the frame members. The track chain tangency route 228 may be understood by imagining the tangential path that a taut string would form when routed about the idler, sliders, sprocket, and track rollers of the assembly.

With continued reference to FIG. 5, the idler 224 and the front slider 400 define a track chain tangency route 228 that includes a front angled segment 230 that extends from the idler 224 to the front slider 400 when the idler 224 is in a retracted state as shown in FIG. 5, forming a first included angle 232 with the top frame member 218 ranging from 10.0 degrees to 25.0 degrees (e.g., 17.5 degrees).

In addition, the inline roller frame assembly 200 may define a horizontal minimum distance 234 from the sprocket axis of rotation 222 to the idler axis of rotation 226, and the track chain tangency route 228 may include a front convex arcuate segment 236 connected, directly or indirectly, to the front angled segment 230 defining a front radius of curvature 238. A ratio of the horizontal minimum distance 234 to the front radius of curvature 238 may range from 3.58 to 4.23 in some embodiments of the present disclosure. In such a case, the horizontal minimum distance 234 may range from 9300 mm to 9600 mm, while the front radius of curvature 238 may range from 2200 mm to 2600 mm. Other ratios and dimensions are possible in other embodiments of the present disclosure.

Also, the track chain tangency route 228 may define a horizontal segment 240 defined by the at least one intermediate slider 500, and a ratio of the horizontal segment distance 235 to the horizontal minimum distance 234 may range from 0.55 to 0.65 (e.g., about 0.61) in some embodiments of the present disclosure.

It should be further noted, that at least three intermediate sliders 500 (may all be identically configured to each other, but not necessarily so) may be provided that are spaced away from each other horizontally, and may be slightly elevated with respect to the front and rear sliders 400. The plurality of slider mounting plates may include three slider mounting plates 300, 302, 304a or more, or less. Four such plates may be provide as shown in FIG. 4.

As also depicted in FIG. 5, the sprocket 220, and the rear slider 400 may define a rear angled segment 242 of the track chain tangency router 228 that extends from the sprocket 220 to the rear slider 400 when the idler is in a retracted state or not, forming a second included angle 244 with the top frame member 218 ranging from 10.0 degrees to 30.0 degrees in some embodiments of the present disclosure.

Similarly, the track chain tangency route 228 may define a rear convex arcuate segment 246 (may be similarly or identically configured to the front convex arcuate segment) connected to the rear angled segment defining a rear radius of curvature 248. A ratio of the horizontal minimum distance to the rear radius of curvature may range from 3.58 to 4.23 in some embodiments of the present disclosure.

A roller frame assembly (such as inline roller frame assembly 200) that may be reinforced to reduce stresses according to an embodiment of the present disclosure will now be discussed.

Figure 8:
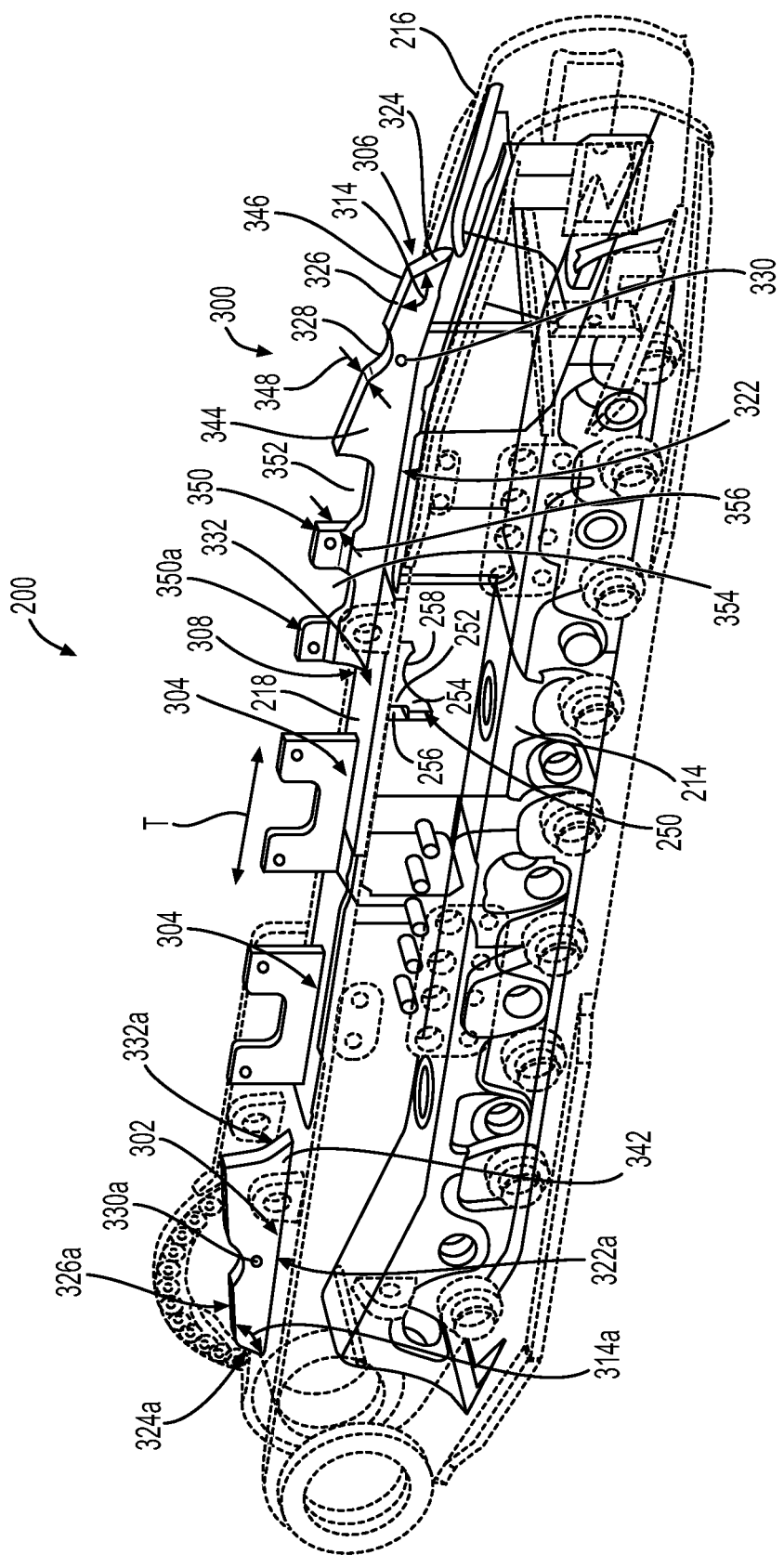
FIG. 8 illustrates the roller frame assembly of FIG. 4 with its bottom portion shown in hidden lines, revealing the added inner gusset plate that supports the rear of the front shark fin configured mounting plate.
Figure 9:
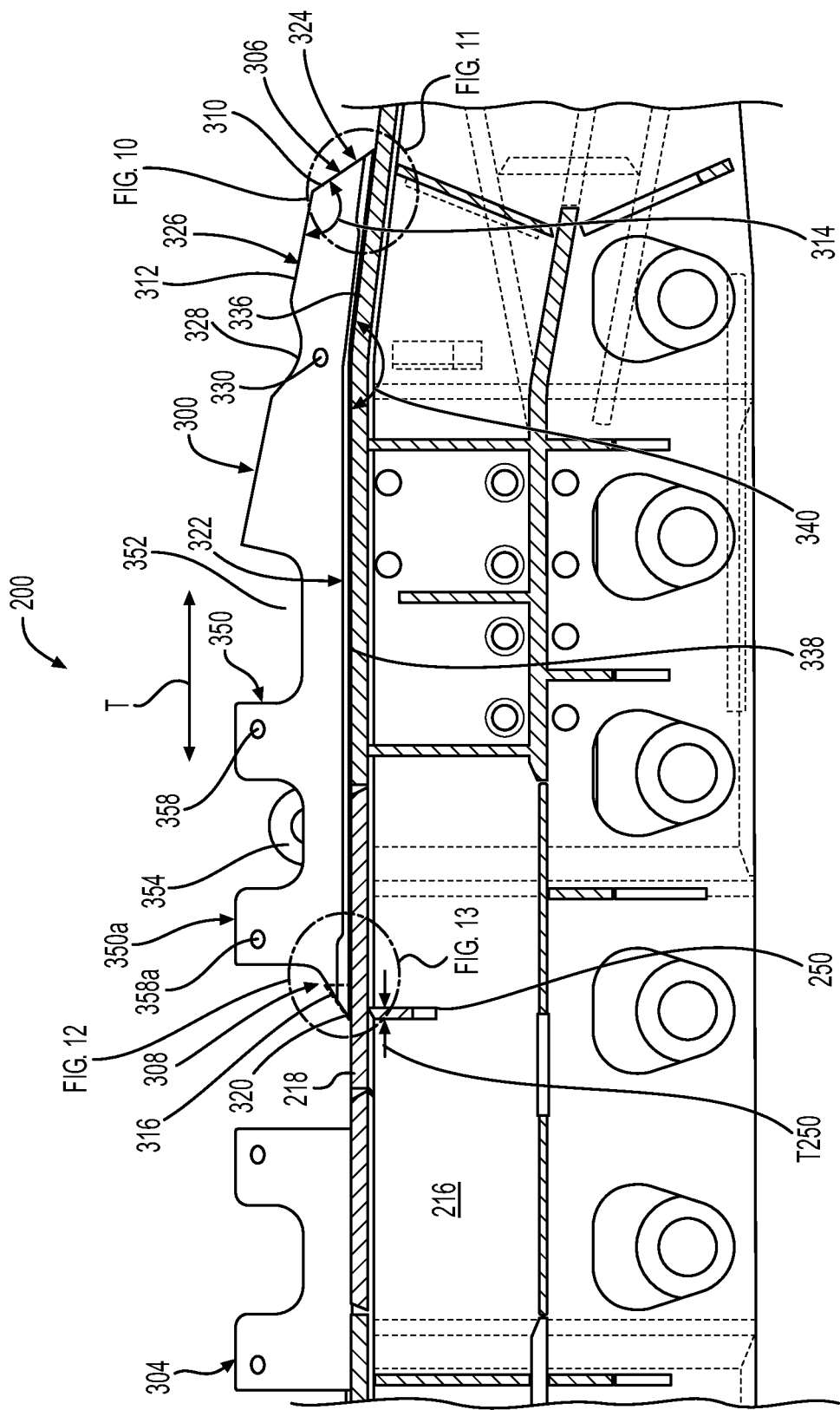
FIG. 9 is a partial side sectional view of the roller frame assembly of FIG. 8, showing the placement of the inner gusset plate to the top support plate relative to the rear end of the front shark fin configured mounting plate.

Looking at FIGS. 8 and 9, such an assembly 200 may comprise a plurality of slider mounting plates including a front slider mounting plate 300 including a front portion 306, and a rear portion 308, and further comprising an inner gusset plate 250 (may also be referred to as a baffle plate) that is attached underneath the top frame member 218 with the rear portion 306 of the front slider mounting plate 300 attached to the top of the top frame member 218 above the inner gusset plate 250 (may be fabricated from a metal or steel plate via water jet cutting, laser beam cutting, wire electric discharge machining, milling, etc.).

FEA (finite element analysis) performed by the inventors has revealed that this reinforcement reduces stresses in this area, helping to prolong the useful life of the components in this area as well as the weld used to attach the front slider mounting plate to the top frame member.

As best seen in FIG. 8, the inner gusset plate 250 may include a reduced width tab portion 252 extending downwardly from the top frame member 218, and an extended width portion extending 254 downwardly from the reduced width tab portion 252. This provides cutouts 256 to help avoid corner interference with the top and side frame members. The extended width portion 254 may abut the first side frame member 214, and the second side frame member 216 to be connected thereto via welding, etc., but not necessarily so. As shown in FIG. 8, the extended width portion of the inner gusset plate defines a bottom concave recess 258. This feature may be omitted in other embodiments of the present disclosure.

In FIG. 9, the front portion 306 of the front slider mounting plate 300 may include a front inclined surface 310, and a top inclined surface 312 that extends from the front inclined surface 310, forming a first oblique angle 314 with the front inclined surface 310 ranging from 120.0 degrees to 150.0 degrees (e.g., 135.0 degrees) in some embodiments of the present disclosure.

Similarly, the rear portion 308 of the front slider mounting plate 300 may include a rear inclined surface 316 defining a first acute angle 318 (see FIG. 12) with the top frame member 218 ranging from 20.0 degrees to 40.0 degrees (e.g., 30.0 degrees), terminating at a rear extremity edge 320 that is disposed above or nearly above the inner gusset plate 250 (see FIG. 9, near enough so the stresses are reduced to a desired amount, i.e., with a distance along the direction of travel T that is equal to or less than the thickness T250 of the inner gusset plate). This may not be the case for other embodiments of the present disclosure.

Any of the ratios or dimensions discussed herein may be varied to be different than what has been specifically mentioned in other embodiments of the present disclosure.

Next, one or more track slider mounting plates may be provided in a kit to retrofit or repair a roller frame assembly in the field.

Such a track slider mounting plate kit may include the plates shown in FIGS. 5, 8, and 9. The kit may have at least a first shark fin configured mounting plate (e.g., see 300, 302) including a first bottom mounting surface 322, 322a, a first beveled surface 324, 324a extending from the bottom mounting surface 322, 322a, and a second beveled surface 326, 326a that extends from the first beveled surface 324, 324a. As best seen in FIG. 8, the first beveled surface 324, 324a may form a first oblique angle 314, 314a with the second beveled surface 326, 326a ranging from 120.0 degrees to 150.0 degrees (e.g., 135.0 degrees) ins some embodiments of the present disclosure.

In FIGS. 8 and 9, the second beveled surface 326, 326a of the at least first shark fin configured mounting plate may be interrupted by a recess 328, 328a, and a thru-aperture 330, 330a may be disposed below the recess 328, 328a. This recess may extend through this plate, but not necessarily so. The thru-aperture 330 may be used to attach (e.g., via a fastener such as a bolt, a cap screw, a pin, etc.) a track slider while the recess 328 may be used to help pry-off the track slider.

Also, the at least first shark fin configured mounting plate (e.g., see 300, 302) may include a third beveled surface 332, 332a that is disposed at an opposite end of the at least first shark fin configured mounting plate as compared to the first beveled surface 324, 324a. The first beveled surface 324, 324a may form a first acute included angle 334 (see FIG. 10) with the first bottom mounting surface 322 ranging from 40.0 to 60.0 degrees in some embodiments of the present disclosure.

The first bottom mounting surface 322, 322a may include a first flat surface 336, and a second flat surface 338 (see FIG. 9), forming an obtuse angle 340 with each other, or a single flat surface 342 (see FIG. 8) in various embodiments of the present disclosure. Other configurations are possible. The first flat surface 336, and the second flat surface may be shaped to match or conform to the top frame member 218.

Focusing on FIG. 8, the mounting plate 300 may include a first side surface 344, and a second side surface 346 that connects the first beveled surface 324 to the second beveled surface 326, defining a first minimum thickness 348. Also as best seen in FIG. 9, this mounting plate 300 may include a first projection 350 that is spaced away from the second beveled surface 326 along traveling direction T, forming a first valley 352 therebetween, and a second projection 350a that is spaced away (along the chain traveling direction T) from the first projection 350, forming a second valley 354 therebetween that is differently configured than the first valley 352. The second valley may also be configured to be used as a pry-slot.

Returning to FIG. 8, the upper portions of the first and the second projections 350, 350a may define a second minimum thickness 356 that is less than the first minimum thickness 348. The second minimum thickness 356 may be manufactured via a milling process. The first projection 350 may define a first thru-hole 358 (best seen in FIG. 9) extending therethrough for allowing a track slider to be bolted to it (see FIGS. 3 and 5). Likewise, the second projection 350a may define a second thru-hole 358a (see FIG. 9) extending therethrough, also allowing a track slider to be bolted to it.

Thus far, both the rear and the front track slider mounting plates have been generically described to comprise the first shark fin configured mounting plate. However, both may be supplied as part of the kit. In such a case, the front track slider mounting plate, which is longer than the rear track slider mounting plate as just described, would be interpreted as the first shark fin configured mounting plate.

In such a case, the rear track slider mounting plate would constitute the second shark fin configured mounting plate (e.g., see 302). Then, its bottom mounting surface 322a as previously described would then be described as a second bottom mounting surface, its first beveled surface 324a as previously described would then be described as a third beveled surface extending from the second bottom mounting surface, and its second beveled surface 326a as previously described would then be described as a fourth beveled surface that extends from the third beveled surface forming an oblique angle. Specifically, this previously described first oblique angle 314a would then be described as a second oblique angle ranging from 120.0 degrees to 150.0 degrees.

Looking at FIG. 4 versus FIG. 5, an intermediate slider mounting plate 304, 304a may be included that has a first U-shaped portion 360 including a first upwardly extending projection 362, and a second upwardly extending projection 362a forming a U-shaped recess 364 therebetween. The recess 364 may be used as a pry slot for removing a track slider. Also, a first mounting aperture 366 may extend through the first upwardly extending projection 362, while a second mounting aperture 366a may extend through the second upwardly extending projection 362a. This allows the track slider to be attached as previously described herein to this mounting plate (see FIGS. 3 and 5).

In FIG. 5, the intermediate slider mounting plate 304a includes a second U-shaped portion 360a that is attached to the first U-shaped portion 360, being identically configured as the first U-shaped portion 360. These portions 360, 360a may be joined together by a bridge portion 368. In FIGS. 3 and 4, the intermediate slider mounting plate 304a is split into two components (e.g., see 304) by omitting the bridge portion.

Other configurations for the plates, the number of plates, additional or omitted features, etc. are possible for other embodiments of the present disclosure.

Next, a transition track slider will be discussed by itself since it may be a sacrificial part or a replacement part supplied to users in the field. The transition slider is so called as it has geometry that helps the track chain assembly change or transition its direction of travel. While the front and rear track sliders are prime examples of a transition track slider, it is contemplated that other track sliders in other positions may also be similarly or identically configured.

In various embodiments of the present disclosure, the track slider may be made from any suitable materials, such as metal, plastic, etc. When metal such as iron or manganese steel is employed, the track slider may be cast and machined to final dimensional tolerances.

It should be noted that the description of the track slider may omit small blends, fillets, chamfers, etc. When the description of these features is omitted, their presence is to be ignored when interpreting this specification including the claims.

Figure 6:
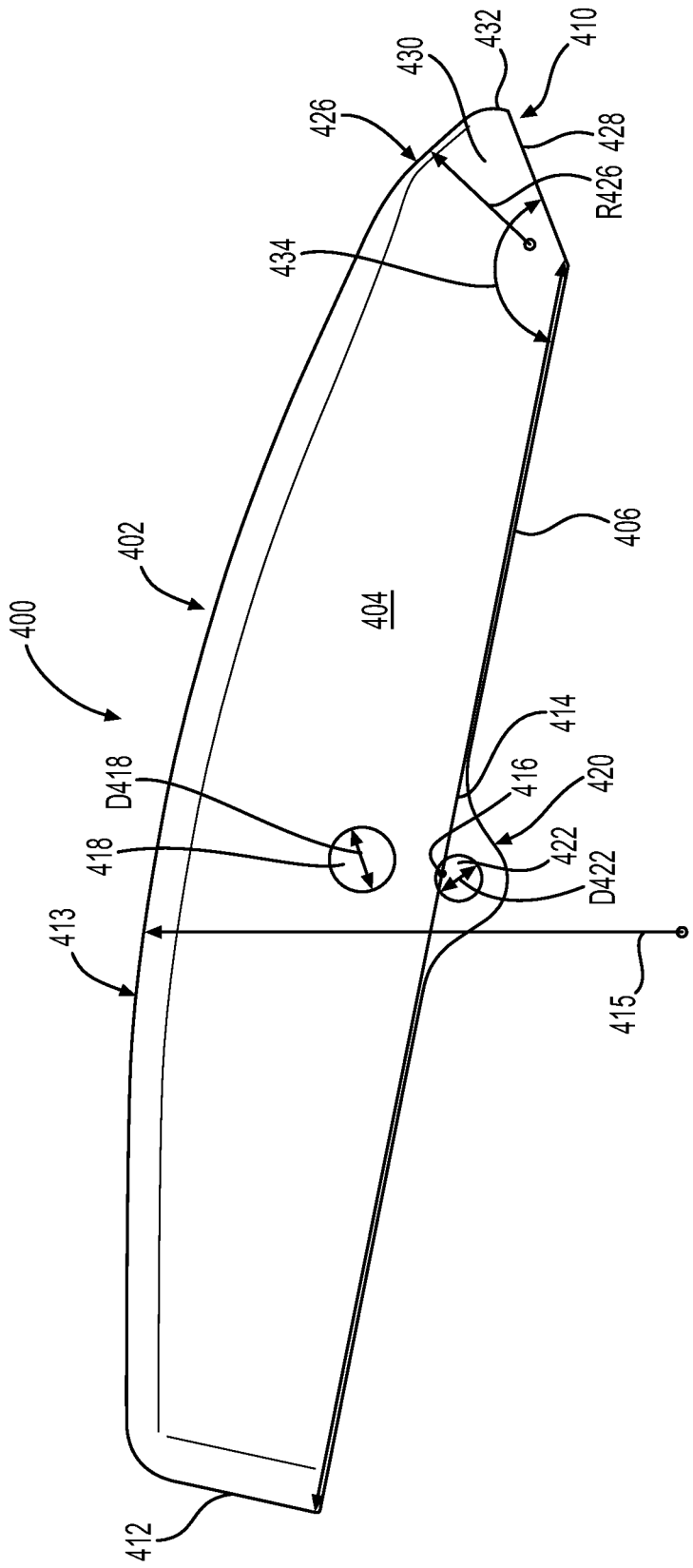
FIG. 6 is a side view of a track slider that may be used at the rear or at the front of the roller frame assembly of FIG. 4, shown in isolation.
Figure 7:
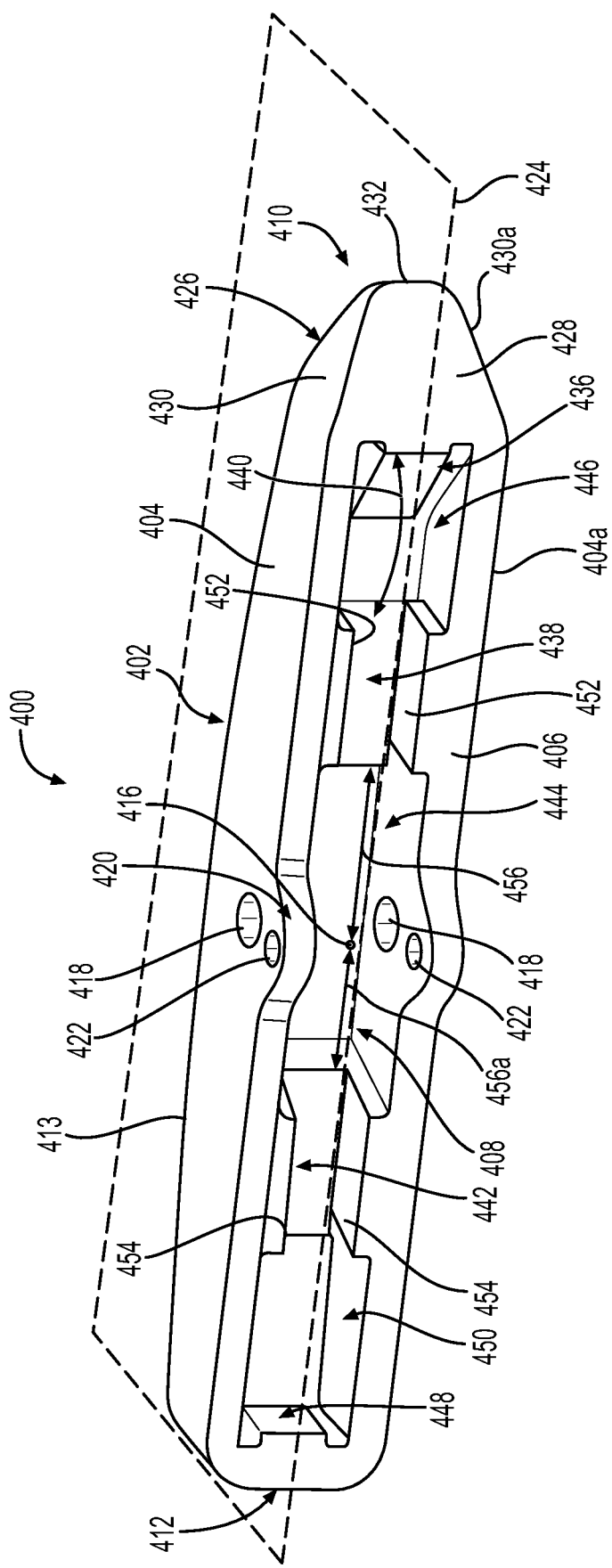
FIG. 7 is a bottom perspective view of the track slider of FIG. 6, depicting its cavity and its associated features for mounting the track slider onto a shark fin configured mounting plate.

Focusing now on FIGS. 6 and 7, a transition track slider 400 may comprise a hollow (or shell) body 402 including a first side surface 404, a second side surface 404a, and a bottom surface 406 (which may be at least partially planar) at least partially interposed between the first side surface 404 and the second side surface 404a, defining a cavity 408.

Also, a front surface 410 may connect the first side surface 404 to the second side surface 404a, and to the bottom surface 406. This front surface may have a bullet nose configuration (this may also be described as a tapered nose configuration) as opposed to a blunt nose configuration in some embodiments of the present disclosure. The bullet nose (or tapered nose) configuration will be described in more detail momentarily herein.

In addition, a rear surface 412 (which may be a generally or completely planar surface) may connecting the first side surface 404 to the second side surface 404a, and to the bottom surface 406, while a top surface 413 may extend from the rear surface 412 toward the front surface 410, defining a top surface radius of curvature 415 (see FIG. 6) that may range from 2200 mm to 2600 mm in some embodiments of the present disclosure. It should be noted that this curvature may be similar or identical to that described earlier herein regarding the front or the rear radii of curvature (238, 248) concerning the track chain tangency route. Further, the top surface radius of curvature 415 may not be the same at all points along the surface, such as when the surface is not an exact or consistent radius, etc.

With continued reference to FIG. 6, it can be understood that the bottom surface 406 may define a length 414, and a midpoint 416 that is disposed along the length 414. At the least the first side surface 404 may define an aperture 418 that is disposed above the midpoint 416. This aperture may extend completely through the hollow body 402 (as shown in FIG. 7), but not necessarily so. It may extend only to the cavity 408, etc.

Moreover, an integral protrusion 420 (may be triangularly shaped, domed shaped, triangularly domed shaped as shown, etc.) may extend downwardly or project outwardly away from the bottom surface 406 that is disposed below the midpoint 416. The protrusion 420 may at least partially define a hole 422 that is disposed below the aperture 418 (may contain at least a portion of the midpoint 416), but not necessarily so. This hole 422 may extend through the protrusion 420 to the cavity 408, and possibly completely through the hollow body 402 (as shown in FIG. 7) but not necessarily so.

The aperture 418 and the hole 422 may be differently configured to serve different functions. For example, the aperture 418 may define a first diameter D418, while the hole 422 may define a second diameter D422 that is less than the first diameter D418. This may allow the user to insert a screwdriver or another pry tool into the aperture 418 to engage the recess of the mounting plate to help pry off the track slider. The hole 422 may allow the track slider to be bolted or otherwise be attached to the mounting plate.

As best seen in FIG. 7, the hollow body 402 may define a plane of symmetry 424 that is disposed equidistantly between the first side surface 404, and the second side surface 404a, but not necessarily so.

As already alluded to herein, the front surface 410 may define a bullet nose configuration. Looking at FIGS. 6 and 7 together, the front surface 410 may include a number of constituent surfaces that form the bullet nose configuration including a top convex arcuate surface 426 that is connected to the top surface 413, defining a top convex arcuate radius of curvature R426 ranging from 350 mm to 370 mm in some embodiments of the present disclosure.

The bullet nose configuration may also include a bottom inclined surface 428 extending from the bottom surface 406 (forming an obtuse included angle 434 ranging from 145.0 degrees to 155.0 degrees, e.g., 150.0 degrees) toward the top convex arcuate surface 426, a first side inclined face 430 joining the bottom inclined surface 428 to the top convex arcuate surface 426, and a second side inclined face 430a joining the bottom inclined surface 428 to the top convex arcuate surface 426.

A front extremity surface 432 (planar or nearly so, which might be slightly arcuate as shown in FIGS. 6 and 7) may connect the first side inclined surface 430, the second side inclined surface 430a, the top convex arcuate surface 426, and the bottom inclined surface 428 together. This surface may be small or omitted altogether in various embodiments of the present disclosure.

The transition track slider 400 may be designed to be attached to a shark fin configured mounting plate as previously mentioned herein.

To that end, the cavity 408 of the hollow body 402 may be configured as follows as depicted in FIG. 7 to have features that are complementarily (or matching) shaped to those of the mounting plate.

For example, a first angled contact pad 436 may be disposed in the cavity 408 nearest the front surface 410, and a first top contact pad 438 may be disposed in the cavity 408 nearest the top surface 413 and the first angled contact pad 436. These features may match the first and the second beveled surfaces of the mounting plate. So, the first top contact pad 438 may form an external angle 440 with the first angled contact pad 436 ranging from 120.0 degrees to 150.0 degrees (e.g., 135.0 degrees). A second top contact pad 442 may be disposed in the cavity 408 that is coplanar with the first top contact pad 438, being separated from the first top contact pad.

More specifically, the cavity 408 has a center void 444 that separates the second top contact pad 442 from the first top contact pad 438, and a front void 446 that separates the first angled contact pad 436 from the first top contact pad 438. Also, a rear contact pad 448 is disposed in the cavity 408 that faces toward the front surface 410, being separated from the second top contact pad 442 by a rear void 450. The contact surfaces of these pads may be planar.

Still referring to FIG. 7, a first pair of side contact surfaces 452 (e.g., planar) may be provided in the cavity 408 extending downwardly from the first top contact pad 438, while a second pair of side contact surfaces 454 (e.g., planar) may be provided in the cavity 408 extending downwardly from the second top contact pad 442. The locations and configurations of these surfaces may be different in other embodiments of the present disclosure.

Various features of the transition track slider 400 may be positioned and/or configured to reduce the bending moment the slider exerts on the mounting plate, helping to reduce stresses.

In order to reduce the bending moment, the first top contact pad 438 may be spaced away from the midpoint 416 a first minimum distance 456, and the second top contact pad 442 may be spaced away from the midpoint 416 a second minimum distance 456a. Either of these distances 456, 456a may range from 190 mm to 250 mm. In some cases, these distances may be the same within a tolerance range.

Again, for any of the embodiments discussed herein, the values of dimensions, angles, and ratios may be varied to be different than anything shown or described herein. Also, various features may be modified in configuration or omitted in various embodiments of the present disclosure, etc. Materials of the various components may also be varied as needed or desired to be different.

INDUSTRIAL APPLICABILITY

In practice, a track slider, a mounting plate, and/or roller frame assembly may be sold, manufactured, bought etc. and in the aftermarket or original equipment scenarios according to any of the embodiments discussed herein. That is to say, the machine may be sold with the roller frame assembly, and/or mounting plate(s), or track slider, etc. according to embodiments described herein or the machine may be retrofitted, repaired, or refurbished to use any of the embodiments discussed herein.

In retrofit situations, previous mounting plates and track sliders may be removed and replaced with the mounting plates and track sliders discussed herein.

Finite element analysis performed by the inventors of the present disclosure have determined that the weld used to attach the various mounting plates may be important in prolonging the longevity of the structure. In particular, a fillet weld bead may be applied to the perimeter of a shark fin configured mounting plate.

Figure 10:
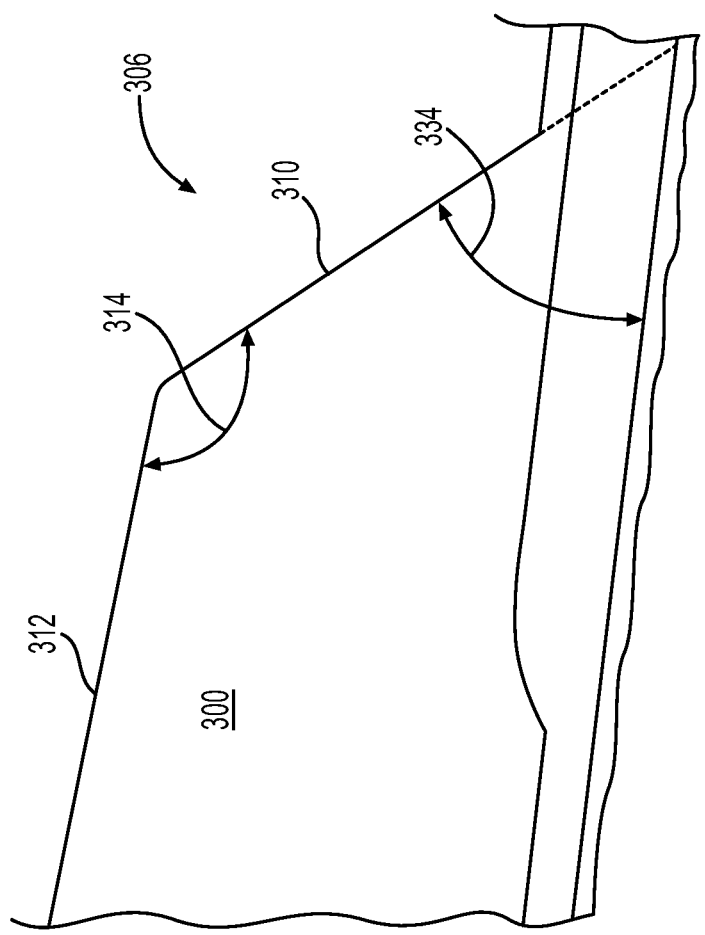
FIG. 10 is an enlarged detail view of the weld at the front end of the front shark fin configured mounting plate of FIG. 9.
Figure 11:
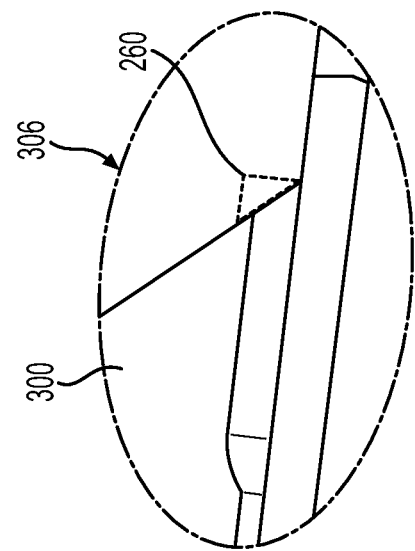
FIG. 11 shows the weld of FIG. 10 after its front edge has been removed.

FIGS. 10 and 11 show a desired weld bead being applied (see FIG. 10) to the front portion 306 of the shark fin styled mounting plate 300. The front section of which is shown being removed (see phantom lines 260) via burning and grinding in FIG. 11.

Figure 12:
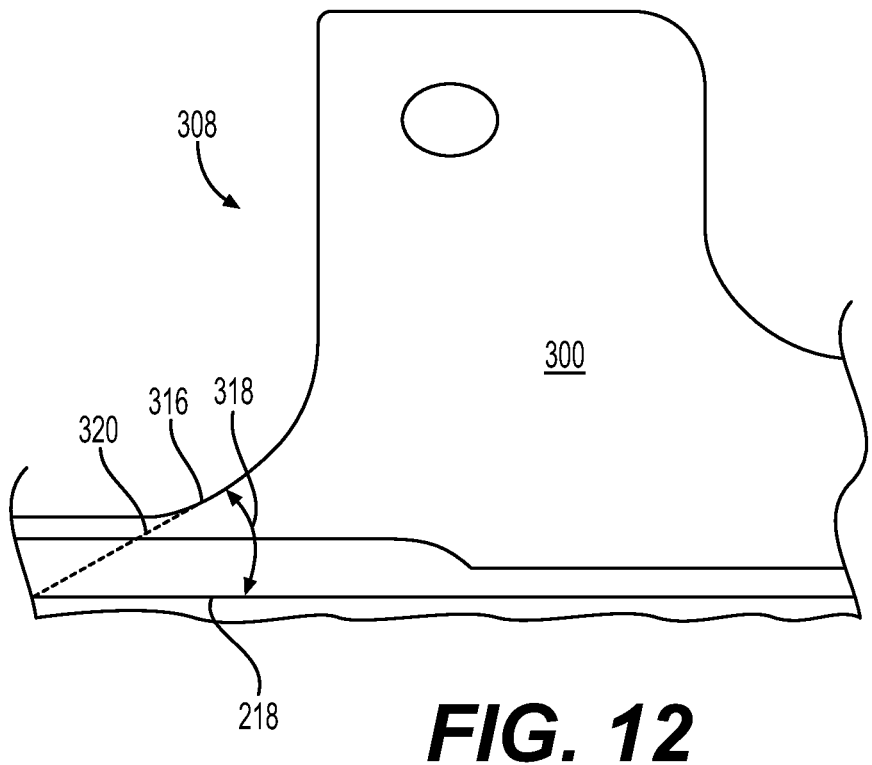
FIG. 12 is an enlarged detail view of the weld at the rear end of the front shark fin configured mounting plate of FIG. 9.
Figure 13:
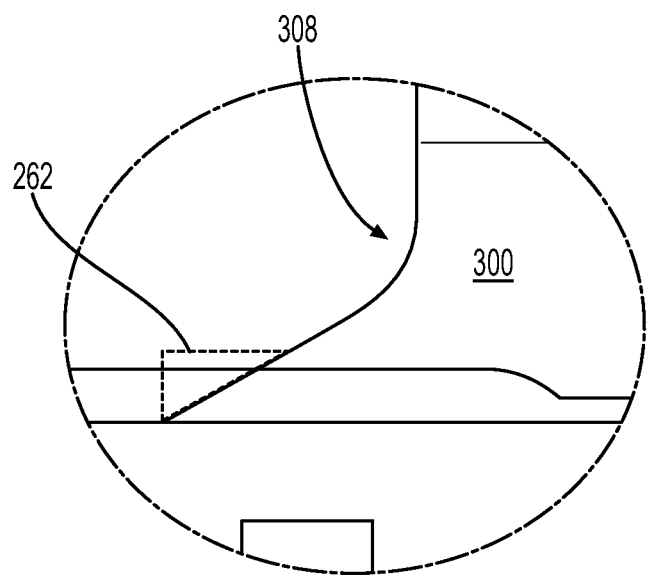
FIG. 13 shows the weld of FIG. 12 after its rear edge has been removed.

Similarly, FIGS. 12 and 13 show a rear portion 308 of the mounting plate 300 with both plate material and the weld being removed (see phantom lines 262) via burning and welding.

The resulting weld has been shown by finite element analysis to provide a robust weld that prolongs the life of the structure by 100% or more.

While the arrangement is illustrated in connection with an electric rope shovel, the arrangement disclosed herein has universal applicability in various other types of machines commonly employ track systems, as opposed to wheels. The term "machine" may refer to any machine that performs some type of operation associated with an industry such as mining or construction, or any other industry known in the art. For example, the machine may be an excavator, wheel loader, cable shovel, or dragline or the like. Moreover, one or more implements may be connected to the machine. Such implements may be utilized for a variety of tasks, including, for example, lifting and loading.

For any of the embodiments discussed herein, the track chain assembly may comprise a plurality of track chain members that are similarly or identically configured. It is to be understood that at least two additional track chain members may be also provided that have different or dissimilar geometry as may be the case for two master links that are joined to the plurality of similar or identically configured track chain members, etc.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A transition track slider comprising:
a hollow body including
a first side surface;
a second side surface;
a bottom surface at least partially interposed between the first side surface and the second side surface, and defining a cavity, wherein the bottom surface defines a length and a midpoint disposed along the length, and at the least the first side surface defines an aperture that is disposed above the midpoint, the aperture extending through the first side surface to the cavity;
a front surface connecting the first side surface to the second side surface and to the bottom surface;
a rear surface connecting the first side surface to the second side surface and to the bottom surface;
a protrusion that extends downwardly from the bottom surface that is disposed below the midpoint, the protrusion at least partially defining a hole that is disposed below the aperture; and
a top surface extending from the rear surface toward the front surface defining a curve.

2. The transition track slider of claim 1, wherein the hole extends through the protrusion to the cavity.

3. The transition track slider of claim 2, wherein the aperture defines a first diameter, and the hole defines a second diameter that is less than the first diameter.

4. The transition slider of claim 3, wherein the hollow body defines a plane of symmetry that is disposed equidistantly between the first side surface and the second side surface.

5. A transition track slider comprising:
a hollow body including
a first side surface;
a second side surface;
a bottom surface at least partially interposed between the first side surface and the second side surface, and defining a cavity;
a front surface connecting the first side surface to the second side surface and to the bottom surface;
a rear surface connecting the first side surface to the second side surface and to the bottom surface; and
a top surface extending from the rear surface toward the front surface;
wherein the front surface defines a bullet nose configuration, and
wherein the hollow body defines a first angled contact pad disposed in the cavity, and a first top contact pad disposed in the cavity, the first top contact pad forming an external angle with the first angled contact pad ranging from 120.0 degrees to 150.0 degrees.

6. The transition track slider of claim 5, wherein the bullet nose configuration of the front surface includes a top convex arcuate surface that is connected to the top surface, defining a top convex arcuate radius of curvature ranging from 350 mm to 370 mm.

7. The transition track slider of claim 6, wherein the bullet nose configuration includes a bottom inclined surface extending from the bottom surface toward the top convex arcuate surface.

8. The transition track slider of claim 7, wherein the bullet nose configuration includes a first side inclined face joining the bottom inclined surface to the top convex arcuate surface.

9. The transition track slider of claim 8, wherein the bullet nose configuration includes a second side inclined face joining the bottom inclined surface to the top convex arcuate surface.

10. The transition slider of claim 9, wherein the bullet nose configuration includes a front extremity surface that connects the first side inclined face, the second side inclined face, the top convex arcuate surface, and the bottom inclined surface together.

11. The transition track slider of claim 5, wherein the rear surface is arcuate.

12. A transition track slider comprising:
a hollow body including
a first side surface;
a second side surface;
a bottom surface at least partially interposed between the first side surface and the second side surface, and defining a cavity;
a front surface connecting the first side surface to the second side surface and to the bottom surface;
a rear surface connecting the first side surface to the second side surface and to the bottom surface; and
a top surface extending from the rear surface toward the front surface;
wherein the hollow body defines a first angled contact pad disposed in the cavity nearest the front surface, and a first top contact pad disposed in the cavity nearest the top surface and the first angled contact pad, forming an external angle with the first angled contact pad ranging from 120.0 degrees to 150.0 degrees.

13. The transition track slider of claim 12, further comprising a second top contact pad disposed in the cavity that is coplanar with the first top contact pad, being separated from the first top contact pad.

14. The transition track slider of claim 13, wherein the cavity defines a center void that separates the second top contact pad from the first top contact pad, and a front void that separates the first angled contact pad from the first top contact pad.

15. The transition track slider of claim 14, further comprising a rear contact pad disposed in the cavity that faces toward the front surface, being separated from the second top contact pad by a rear void.

16. The transition track slider of claim 15, further comprising a first pair of side contact surfaces disposed in the cavity extending downwardly from the first top contact pad, and a second pair of side contact surfaces disposed in the cavity extending downwardly from the second top contact pad.

17. The transition track slider of claim 16, wherein the bottom surface defines a length and a midpoint disposed along the length, the first top contact pad is spaced away from the midpoint a first minimum distance, and the second top contact pad is spaced away from the midpoint a second minimum distance, and either the first minimum distance or the second minimum distance ranges from 190 mm to 250 mm.

18. The transition track slider of claim 1, wherein the curve has a radius of curvature ranging from 2200 mm to 2600 mm.

19. The transition track slider of claim 1, wherein the protrusion is triangularly shaped, domed shaped, or triangularly-domed shaped.

20. The transition track slider of claim 1, wherein the aperture is configured to accept a pry tool and wherein the hole is configured to accept a fastener to attach the transition track slider to a mounting plate.

* * * * *